United States Patent
Knauss

(10) Patent No.: US 6,617,754 B1
(45) Date of Patent: Sep. 9, 2003

(54) CIRCUIT FOR THE DYNAMIC CONTROL OF CERAMIC SOLID-STATE ACTUATORS

(75) Inventor: Uwe Knauss, Prien-Atzing (DE)

(73) Assignees: GSG Elektronik GmbH, Rosenheim (DE); Physik Instrumente (PI) GmbH & Co., Waldbronn (DE)

( * ) Notice: Subject to any disclaimer, the term of this patent is extended or adjusted under 35 U.S.C. 154(b) by 0 days.

(21) Appl. No.: 09/673,687
(22) PCT Filed: Apr. 19, 1999
(86) PCT No.: PCT/EP99/02625
§ 371 (c)(1), (2), (4) Date: Dec. 22, 2000
(87) PCT Pub. No.: WO99/56327
PCT Pub. Date: Nov. 4, 1999

(30) Foreign Application Priority Data

Apr. 23, 1998 (DE) .......................................... 198 18 273
Jun. 5, 1998 (DE) .......................................... 198 25 210

(51) Int. Cl.⁷ .................... H01L 41/06; H01L 41/08; H01L 41/04; H01L 41/18; H02N 2/00
(52) U.S. Cl. .................. 310/316.02; 310/317; 310/318; 318/114; 318/118; 318/119
(58) Field of Search ................ 310/316, 317, 310/318, 319; 318/114, 118, 119

(56) References Cited

U.S. PATENT DOCUMENTS

| | | | | |
|---|---|---|---|---|
| 4,688,536 A | * | 8/1987 | Mitsuyasu et al. | 123/490 |
| 4,947,074 A | * | 8/1990 | Suzuki | 310/316 |
| 4,973,876 A | * | 11/1990 | Roberts | 310/316 |
| 5,017,010 A | * | 5/1991 | Mamin et al. | 356/345 |
| 5,196,713 A | * | 3/1993 | Marshall | 250/561 |
| 5,208,505 A | * | 5/1993 | Mitsuyasu | 310/317 |
| 5,625,550 A | * | 4/1997 | Leggate et al. | 363/132 |
| 5,627,447 A | * | 5/1997 | Unsworth et al. | 318/801 |
| 5,635,788 A | * | 6/1997 | Soltermann et al. | 310/317 |
| 5,671,130 A | * | 9/1997 | Kerkman et al. | 363/41 |
| 5,739,622 A | * | 4/1998 | Zaitsu | 310/316 |
| 5,917,721 A | * | 6/1999 | Kerkman et al. | 363/98 |
| 6,034,484 A | * | 3/2000 | Danov et al. | 315/209 PZ |
| 6,081,061 A | * | 6/2000 | Reineke et al. | 310/316.03 |
| 6,147,433 A | * | 11/2000 | Reineke et al. | 310/316.03 |
| 6,198,199 B1 | * | 3/2001 | Hoffmann et al. | 310/316.03 |
| 6,433,461 B1 | * | 8/2002 | Shibatani | 310/317 |
| 6,469,616 B1 | * | 10/2002 | Lindner et al. | 340/5.26 |
| 6,486,615 B2 | * | 11/2002 | Hui et al. | 315/291 |

FOREIGN PATENT DOCUMENTS

| | | |
|---|---|---|
| DE | 4435832 | 4/1996 |
| WO | 9907026 | 2/1999 |

OTHER PUBLICATIONS

Patent Abstracts of Japan, vol. 016, No. 282 (M–1269), Jun. 23, 1992 & JP 04 071859 A (Brother Ind Ltd), Mar. 6, 1992.

* cited by examiner

Primary Examiner—Thomas M. Dougherty
Assistant Examiner—Pedro J. Cuevas
(74) Attorney, Agent, or Firm—Friedrich Kueffner

(57) ABSTRACT

The invention relates to a circuit arrangement for the dynamic control of ceramic solid-state actuators, such as piezotranslators with energy recovery by means of magnetic intermediate stores and/or storage capacitors as well as by clocked switches. For achieving a predetermined linear voltage characteristic at the piezotranslator, according to the invention, a single inductive intermediate store is arranged in the secondary circuit, which is connected in series with the piezotranslator, and the secondary circuit is designed as a half-bridge. The switches provided in the respective half-bridge are controlled at a high cycle or switching frequency by an external controller, with the series connection of piezotranslator and inductive intermediate store furthermore carrying a superimposed bridge direct current in order to ensure the desired charging of the capacitance of the piezotranslator, on the one hand, and to optimize the energy recovery, on the other hand.

10 Claims, 3 Drawing Sheets

CIRCUIT FOR THE DYNAMIC CONTROL OF CERAMIC SOLID-STATE ACTUATORS

BACKGROUND OF THE INVENTION

1. Field of the Invention

The invention relates to a circuit arrangement for the dynamic control of -ceramic solid-state actuators, such as for example, piezotranslators with energy recovery by means of magnetic intermediate stores as well as a control loop for operating a piezotranslator.

2. Description of the Related Art

Piezotranslators are electrically controllable actuators whose functions can be attributed to the piezoelectric effect. Active sensors, so-called actuators, can perform the most delicate positioning movements with high accuracy from the subnanometer up to the millimeter range.

Under electrical aspects, a piezotranslator represents a capacitor whose charge has a proportional relationship to its expansion. Consequently, piezotranslators take up energy during the expansion process only. The expansion is maintained without further energy supply. Due to the high capacitance of the piezotranslators, however, a high output power of the driver circuit is required in the case of fast positional changes as they occur under dynamic operation conditions. The associated control electronics must therefore have special properties for each application case and has to be optimised in order to ensure the successful employment of a piezotranslator.

In control processes for the dynamic piezocontrol in which the actuating element must follow up fast changes of a reference variable, it is desired that the amplitude of the movement characteristic agrees with the input signal as close as possible. However, such a linear transfer behaviour cannot be ensured for frequencies up to any magnitude, but is limited, on the one hand, by the resonance frequency of the translator or the entire actuating system, respectively, and by the output power of the amplifier, on the other hand.

Due to the hysteresis phenomena of a piezotranslator the absolute expansion of the actuating element can be determined only inaccurately via the applied amplified input voltage of the amplifier. The resulting expansion has an inherent error of up to 10%, both with respect to its absolute value and to its relative movements. In order to eliminate this error, it is known to provide closed control loops, i.e.. a measuring system for the expansion and control electronics which control the operating voltage in accordance with a comparison of the reference variable and the actual value. Closed positioning control loops are therefore provided with external probes in order to be able to determine the position.

Due to the fact that piezotranslators can electrically be described as capacitors, as mentioned above, onto which electric charges must either be applied or from which said charges must be withdrawn for the purpose of a length variation, which for example can be realised by means of a switch, charging or discharging between the piezotranslator, on the one hand, and the charging current circuit, on the other hand, will inevitably result in power losses, if this is done via controllable variable resistors,. e.g. transistors.

From the final report of the joint project "Entwicklung leistungsoptimierter, hybrider Hydraulikkomponenten auf der Basis piezoelektrischer Aktuatoren" (Development of Power-Optimised Hybrid Hydraulic Components on the Basis of Piezoelectric Actuators) of the Institut für Fertigungstechnik und spanende Werkzeugmaschinen (Institute of Manufacturing Engineering and Metal Cutting Machine Tools), Hanover, Germany, November 1996, it is known to design digital control amplifiers for driving piezoelectric actuators, which are provided with a controlled energy recovery capacity. The known final stage preferably includes inductively coupled coils in order to increase the efficiency of the energy recovery.

In the known circuit arrangement two separate magnetic intermediate energy stores are provided, with the energy stores being switched by a controller in a clocked manner, in order to achieve a predetermined output voltage curve of the control circuit. At the piezotranslator a voltage-dependent non-linear charging of the capacitance will result, with the available current decreasing upon reaching the supply voltage. Due to the circuit arrangement as two separate blocking transformers, only one direction each of the output current can be driven.

In order to obtain a desired linear voltage increase at the piezotranslator, the storage volume of each store must be designed extremely large in the state of the art. The reason of this is that the blocking transformer must be dimensioned according to the smallest voltage increase AU at the range limits of the operating voltage. In the middle output range, however, the available storage volume cannot be utilised so that a correspondingly implemented output amplifier does not operate efficiently.

With respect to the control of piezotranslators in actual applications, the actual momentary value of the output voltage supplied to the piezotranslator is determined by means of a control loop. This is to compensate for existing deficiencies of the control circuit or the final stage, respectively, such as its non-linearity, temperature drift, and frequency dependence, as well as any undesired behaviour of the connected piezotranslator because of the already mentioned voltage hysteresis.

In this context, it has been known to apply part of the piezo output voltage as the actual value to the input of an error amplifier, or to use an exact physical measuring system which yields an output voltage as the actual value. The desired reference variable is supplied to the input of the error amplifier, with the output of the amplifier being connected to the control circuit itself.

The above described controller concept achieves satisfactory results with arrangements without energy recovery, which are mostly equipped with a conventional loss-inherent final stage of the type of controlled series resistors. However, problems occur with a corresponding use in energy recovering control circuits. The reason for this is the considerable inductances which are responsible for the desired energy recovery and which are connected in series to the piezotranslator. Together with the piezotranslator which represents a capacitor these form a high-quality series or resonance circuit. Depending on the type or size of the translator and employed inductor, its resonance frequency is mostly within the frequency band in the range from 1 to 5 kHz, which is of interest for the amplifier operation. The series resonance circuit in turn causes a high increase of the amplification in the resonance range, together with an undesired phase shift in the working band of the control loop approaching the critical 180° limit, which affects the compensation. From this, an undesired post-pulse oscillation or self-oscillation results. The desired flat amplitude characteristic of the overall system up to the upper working frequency range is therefore no longer achievable.

Therefore, it is the object of the invention to provide a circuit arrangement for the dynamic control of piezotranslators with energy recovery as well as an improved control loop for the operation of piezotranslators, which allow the almost linear charging of the piezotranslator over the entire voltage range and at the same time the optimisation of the energy recovery with a small installation size of the implemented circuit. Simultaneously, energy storing elements such as capacitors or accumulators must be able to be operated at a maximum piezotranslator supply voltage so that the return currents can be maintained correspondingly low. With respect to the control loop, it is essential to prevent points of resonance in the working and transfer range so that any self-oscillation can effectively be avoided.

SUMMARY OF THE INVENTION

The object of the invention is solved in that for achieving a predetermined linear voltage characteristic at the piezotranslator, the secondary circuit is designed as a half-bridge consisting of the clocked switches at whose output the inductive intermediate store is arranged in series with the piezotranslator, with the clocked switches being externally controlled and operated at a high cycle or switching frequency in such a manner that the intermediate store is alternately connected with an upper or lower supply voltage at the most, with the series connection of piezotranslator and inductive intermediate store carrying a superimposed bridge direct current as well as, as far as the closed loop control is concerned, by a third controller for a positioning control, at whose first input the reference variable of the physical position of the piezotranslator and at whose second input a mechanical actual value which is detected via a sensor of the piezotranslator are applied, with the output of the third controller being connected with one of the inputs of the second controller, wherein preferably the second controller feeds back the integral of the piezotranslator current in lieu of a voltage which is proportional to the output voltage of the final stage. The remaining dependent claims represent at least suitable embodiments or developments of the invention.

The basic idea of the invention is to form the control circuit for the dynamic operation of piezotranslators as a half-bridge circuit with a single series coil as an intermediate energy store. In this case, the maximum available current for charging and discharging the piezotranslator is identical with the maximum current of the series coil. Such a limitation occurs unchanged and at a constant limit current over the entire range of the piezo output voltage. For the capacitance of the piezotranslator the constant limit current causes a constant voltage increase so that the storage capacity of the intermediate energy store is uniformly and fully utilised over the entire working range. The installation size can be reduced due to the use of a single series coil, with the indirect consequence of a cost reduction.

According to the invention, a direct-current superimposed single coil is employed as an intermediate energy store, with the coil to be considered as a forward converter under the aspect of its effect. The coil direct current flows during the entire activation period and is modulated by a high-frequency alternating current with a relatively small amplitude at the working cycle of the half-bridges, i.e. of the employed switches, at a frequency of essentially 100 kHz.

By means of the inventive arrangement of a single inductive magnetic intermediate store in the secondary circuit which is connected in series with the piezotranslator and with the secondary circuit being designed as a half-bridge, it is possible to significantly increase the efficiency of the power final stage formed in this manner. Due to the fact that there is no internal electrical isolation, the losses can be reduced further. Also otherwise present drawbacks due to voltage losses at the energy recovery diodes do no longer occur in a comparable magnitude. A transfer of the entire energy in the piezotranslator in each modulation wave to the primary side and back again as this is the case in the state of the art is no longer necessary.

Due to the fact that the only energy store is located on the secondary side and is subjected to the high piezo voltage which, depending on the translator type, is between 100 and 1200 V, the currents during the energy recovery can be kept low. With respect to circuit engineering, the only intermediate store can be arranged in a spatially close relationship with the piezotranslator so that electromagnetic radiated noise can be reduced to a minimum. A still better electromagnetic compatibility results from the effective modulation current which is superimposed by only a low high-frequency alternating current according to the external cycling of the half-bridges. By a corresponding dimensioning of the inductive intermediate store, the superimposed alternating current is in the order of essentially 10% of the modulation current so that the residual ripple will be greatly reduced.

Another basic idea of the invention is that when using MOSFETs as switches, the negative effects of existing internal inverse diodes can be avoided. For this purpose, the invention proposes to connect an external blocking diode in series with the clearance between open contacts and to bridge this series connection by an oppositely poled commutating diode. This additional diode combination prevents the inverse operation of the MOS transistors by its internal inverse diode and allows a quasi external inverse operation by the commutating diode which is oppositely poled with respect to the external blocking diode.

The additional diodes have a shorter recovery time relative to the MOS transistor in order to considerably improve the operation of the modified half-bridge circuit under the aspect of the switching frequency.

In the inventive control concept and according to another basic idea of the invention, a current sensor for determining a control voltage which is proportional to the output current is arranged for controlling the piezotranslator. This current sensor is connected with the input of a first controller, with the second input of the first controller being applied to the output of a second controller at whose inputs a given reference variable corresponding to the physical position of the piezotranslator and the reduced output voltage is applied.

Accordingly, the control concept consists of two nested, separate control loops, i.e. an inner and an outer control loop. The inner control loop encompasses the control circuit proper, including a potentially critical point of resonance which is formed by the magnetic energy stores which are provided there in any form and the capacitive load of the piezotranslator.

By means of the outer control loop it is possible to achieve the characteristic of the output voltage which is defined by the input signal, i.e. the reference variable, of the position and expected with an amplified amplitude at the amplifier output.

Due to the fact that the inner control loop has already eliminated the point of resonance and the associated additional phase shift in the working frequency range, the outer control loop can be optimised in a simple manner. As a whole, the design of the circuit arrangement for controlling purposes offers an improved overall transfer behaviour. The amplitude characteristic is uniform over the entire frequency range, including the point of the critical LC circuit and drops without transition point. The phase characteristic has a phase margin of at least 50° and is not critical, while it is possible to keep the time behaviour at the maximum system dynamics free from resonances and overshooting.

As explained above, the inner control loop operates by utilising a current proportional sensor signal, with a current transformer being provided for this purpose. This current transformer can be realised by a simple series resistor in the return line of the load current or by a simple transformer circuit. The inner control loop thus enforces a current of a predetermined magnitude at the output of the final stage or of the control circuit, respectively, which flows into the load and which can be controlled in its time characteristic by the specified reference variable. Any additional loads connected with the capacitive piezotranslator load, such as, for example, a storage coil, have no influence on the common load current and cannot cause resonance phenomena.

Due to the fact that the voltage which is normally building up at the piezotranslator is defined by the integral of the current, the now controlled current, however, no longer has a point of resonance, it is possible to keep the piezovoltage, too, free from resonances. The inductance of the intermediate store, which is introduced for energy recovery, is no longer detected by the control behaviour of the inner control loop as a resonance-generating component and thus eliminated to the outside.

In an embodiment of the invention, an additional positioning control of the system is performed according to another basic idea, in that a third controller is provided at the first input of which the reference variable of the physical position of the piezotranslator and at the second input of which a physical actual value of the piezotranslator, which is detected via a sensor, is applied, with the output of the third controller being connected with one of the inputs of the above mentioned second controller.

The dynamic behaviour of the control system with inner and outer control loop can be improved according to another basic idea of the invention in that the second controller feeds back the integral of the piezotranslator current instead of controlling an output voltage which is proportional to the reference variable. This alternative feedback can be activated in a frequency dependent manner.

In a preferred embodiment, the integration value is used at frequencies of essentially >10 Hz, and at frequencies of <10 Hz, the mentioned voltage feedback is performed.

The described advantage of the improved pilot control also has a positive influence of those control loops in which an additional positioning control by means of a further controller is dispensed with. These advantages are particularly effective at the upper limit of the working frequency range where the loop amplification must be reduced because of the operational stability and is therefore too low for an effective error compensation.

BRIEF DESCRIPTION OF THE DRAWINGS

The invention will be described in more detail by means of embodiments as well as with reference to the figures in the following.

In the figures.

DESCRIPTION OF PREFERRED EMBODIMENTS

Figure 1:
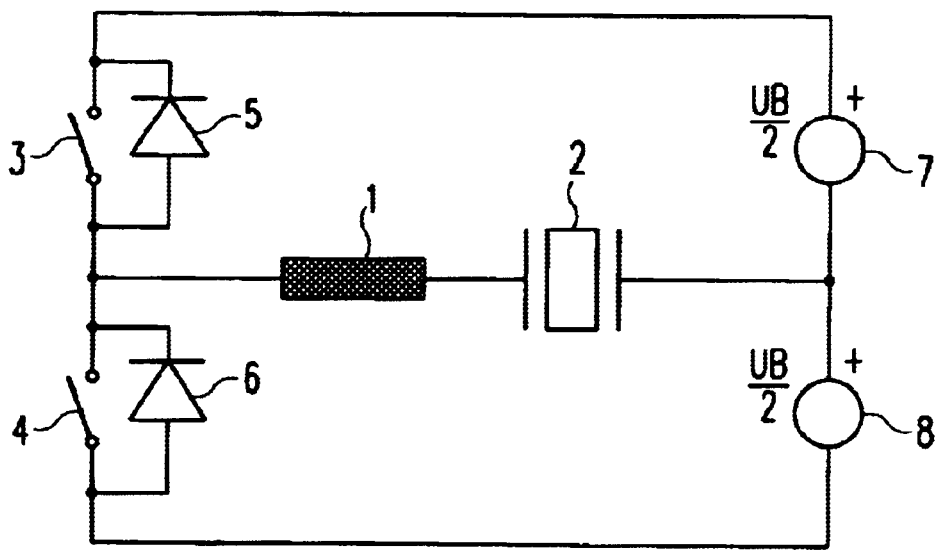
FIG. 1 shows a circuit diagram of the circuit arrangement for the dynamic control of piezotranslators with energy recovery.

As can be seen, a single inductive intermediate store 1 is connected in series with the piezotranslator 2. The illustrated secondary circuit shows a half-bridge arrangement, with switches 3 and 4 being externally clocked with up to 100 kHz. The switches 3 and 4 are bridged by energy recovery diodes 5 and 6. In the configuration of the switches 3 and 4 as MOSFETs such diodes are integral members of this transistor family.

Voltage sources 7 and 8 for one half-bridge each are formed by a switched-mode power supply known per se and comprise suitably dimensioned storage capacities.

The coil direct current is superimposed by a low, high-frequency direct current of small amplitude in the working cycle of the half-bridges. The only energy store 1 reduces the storage volume with respect to size and is operative both during charging as well as discharging of the piezotranslator's capacitance, i.e. over the entire operating time.

Compared to the known state of the art, the switching losses according to the arrangement of the embodiment are considerably lower. In order to obtain the intended linear output voltage curve, the switches 3 and 4 are activated by a corresponding controller with high cycling or switching frequency. The ratio of the closing times of switches 3 and 4 defines the working direction "charging" or "discharging". At the piezotranslator 2 a linear charging of its capacitance in the entire voltage range from 0 to UB max. is obtained.

Figure 2:
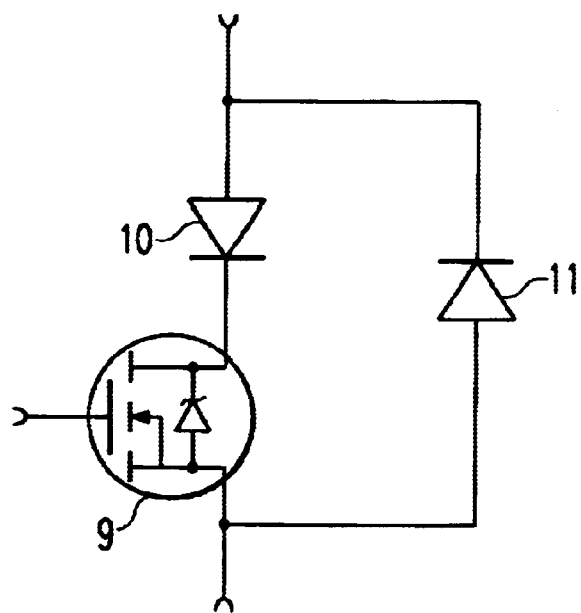
FIG. 2 shows a configuration of the MOSFET switch with an external blocking diode and a commutating diode oppositely poled relative to same.

With reference to FIG. 2, a preferred external wiring of a MOS transistor or a MOSFET, respectively, to be used in the circuit arrangement according to FIG. 2, will be explained in more detail.

For circuit engineering reasons, the mentioned switches 3 and 4 are employed in the final stages of the half-bridge according to FIG. 1. The connection of the intermediate store 1 is alternately made with the upper or lower supply voltage UB/2, respectively. Not more than one of the two switches 3; 4 is closed. Because of the configuration of the circuit arrangement, currents with both positive and negative sign occur at the switches 3 and 4. For example, a current flows through the closed switch at times which increases the average current in the intermediate store 1, which returns half a modulation period later as a so-called commutating current for the purpose of energy recovery.

In the case in which MOS transistors are used for the switches 3 and 4, the current return flow is not effected via the active element itself but via an internally provided parasitic inverse diode which is an inevitable element of the transistor. These inverse diodes need a considerable recovery time after having been temporarily subjected to a return current so that the MOS transistor can only be switched off with a long delay time. Therefore, said transistor, following an application of a return current, behaves like a complete short circuit over some time.

For operational reasons, long-term return currents flow in the described half-bridge for energy recovery, which originate from the energy store 1 and have been induced there, which pulsate with the modulation frequency and which, without external measures, continue for a multiple of the desired high clock frequency of 100 kHz. If such a current flows e.g. through the switch 3 inversely into the upper supply voltage UB/2, and if the switch 3 is then blocked for operational reasons and the switch 4 is closed, then a short circuit occurs in the clearance between open contacts 3, 4 during the recovery time of the switch 3 because the switch 3 cannot open immediately. This will be repeated with the repetition or clock frequency, respectively, and is responsible for an essential portion of the losses within the circuit arrangement.

As can be seen from FIG. 2, the MOS transistors are modified by a special external diode circuit. In the case at hand, an external blocking diode 10 is connected in series with the clearance between open contacts, with this series connection being bridged by a commutating diode which is oppositely poled to the external blocking diode 10.

With such an arrangement it is possible to optimise the switching behaviour and to considerably reduce the power loss of the circuit arrangement in its entirety.

Figure 3:
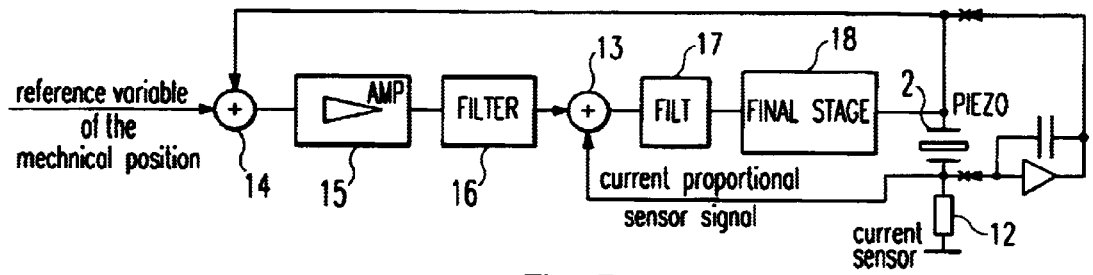
FIG. 3 shows a block diagram of the control system with an inner and an outer control loop comprising the optional possibility to adapt the outer control loop to the integration value of the current.

The control concept according to FIG. 3 assumes an inner current control loop combined with an outer current control loop. The outer current control loop can be configured in such a manner that the integral of the piezotranslator current is sensed and fed back instead of controlling an output voltage which is proportional to the reference variable. This alternative can be utilised in a frequency dependent manner, e.g. with f>10 Hz, so that the dynamic behaviour of a corresponding control loop for a piezotranslator is improved.

For controlling the piezotranslator 2, a current sensor 12 is provided in the secondary circuit according to FIG. 3, which generates a control voltage which is proportional to the output current. Said current sensor 12 is connected with a first input of a first controller 13, with the second input of the first controller 13 being applied to the output of a second controller 14, if required, by connecting an amplifier and a filter 15 and 16 in between. At the input of the second controller 14 a predetermined reference variable corresponding to the physical position of the piezotranslator, on the one hand, and the fed back voltage of the secondary circuit or the integral of the piezotranslator current, on the other hand, are applied.

The final stage 18 which is controlled by the output of the first controller 13 via a filter 17 can correspond to the circuit arrangement for controlling according to FIG. 1, but can also be formed by two blocking transformers according to the state of the art. The inner control loop which is formed by the current sensor 12 and the first controller 13 comprises the final stage 18 including a potentially critical point of resonance which is generated by energy stores provided for energy recovery and the capacitive load of the piezotranslator 2. For the purpose of generating the characteristic of the output voltage which is specified by the reference variable of the position and expected at the amplifier output with an amplified amplitude, the outer control loop comprising the second controller 14 with voltage feed-back is provided.

In the case where the integral of the piezotranslator current is fed back, the outer control loop comprising the second controller 14 causes a correspondingly pre-distorted characteristic of the amplifier output voltage which, however, corresponds to an essentially similar characteristic of the movement which is actually carried out by the piezotranslator 2 by the reference variable of the position without any hysteresis interference of the translator.

Figure 4:
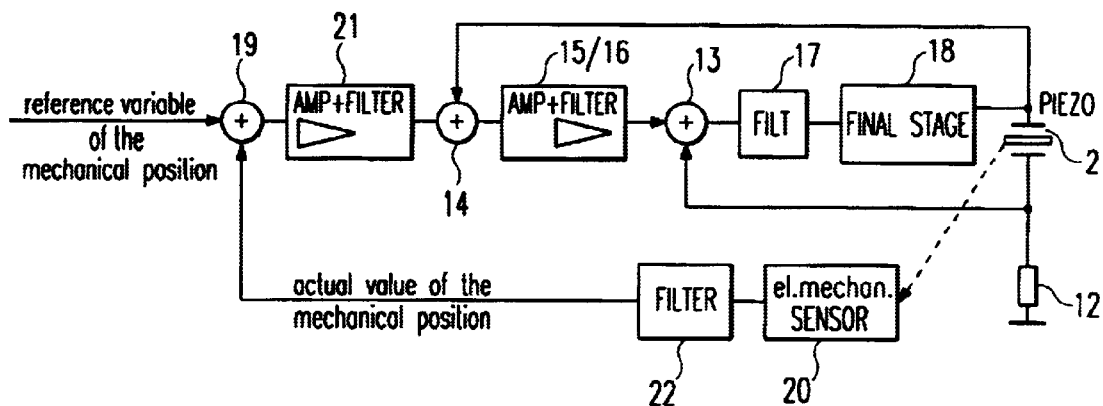
FIG. 4 is an illustration of the control system with additional positioning control.

The embodiment according to FIG. 4 shows an additional positioning control, with reference being made to the explanations in conjunction with FIG. 3 with respect to the inner and outer control loop. The same elements are identified by identical reference numerals.

A third controller 19 is provided for positioning control, at whose first input the reference variable of the physical position of the piezotranslator 2 and at whose second input a physical actual value sensed via a sensor 20 of the piezotranslator 2 is applied. The output of the third controller 19 is connected with a corresponding input of the second controller 14, if required, by connecting an amplifier-filter combination 21 in between.

Switching and actuating the switches 3 and 4 with a clock frequency of approx. 100 kHz generates a residual ripple in the coil 1 and thus in the output current. Although this high-frequency ripple at the piezotranslator 2 will no longer result in a uniform physical movement, it nevertheless causes a considerable mechanical stress, the extent of which depends on the type of ceramic, acting on this actuator element due to heavy partial oscillations.

According to a further embodiment a reduction of the current ripple which is superimposed on the output current can be achieved as follows.

A series resonance circuit, formed by an inductance and a capacitor, is arranged in parallel with the piezotranslator. The two components make up a resonance circuit which is adjusted to the high clock frequency of 100 kHz. It diverts the high-frequency current to ground and thus past the piezotranslator 2. The advantage resulting therefrom can either be utilised for the piezotranslator 2 under the aspect of service life or for a further reduction of the inductance 1.

Figure 5:
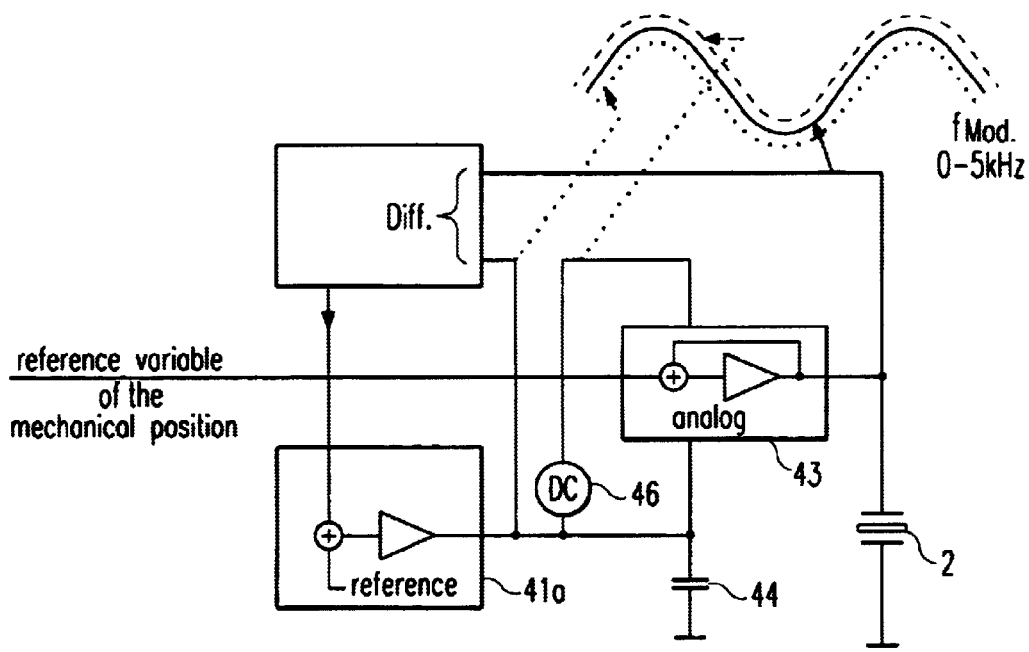
FIG. 5 shows a block diagram for reducing the low-frequency voltage noise.

As shown in FIG. 5, there is the possibility of reducing the low-frequency output voltage noise of the circuit arrangement by means of a circuit expansion.

Due to the rapidly changing high switching currents and voltages an interference voltage in the form of a low-frequency noise voltage occurs, independently of and superimposed on the desired modulation, at the output of an amplifier which is connected for energy recovery reasons. This is the case, in particular, if the high-frequency pulse sequence supplied to the final stage by the controller includes a so-called jitter, i.e. a statistically distributed jitter of the switching times included therein.

The noise voltage which is undesirably superimposed on the desired piezovoltage affects maintaining of a stable physical position of the actuating element piezotranslator in the case of being controlled by a fixed reference variable. However, corresponding mechanical variations are superimposed on a desired modulation as well.

It was already proposed to avoid the problem of high-noise switched amplifiers by connecting an additional final stage for fine control between said amplifiers and the load proper. This final stage operates to the conventional, loss-inherent, analog technology in the form of variable resistors and generates a relatively noise-free output signal. Due to the fact that the downstream connected final stage with the coarsely pre-controlled output voltage of the connected amplifier, which for this purpose, can be adjusted higher by a fixed small amount, only a negligible power loss will occur there. Contrary to the more frequent ohmic loads which do not require active discharging, said discharging must be included in suitable amplifiers for the inductive piezotranslators.

Figure 6:
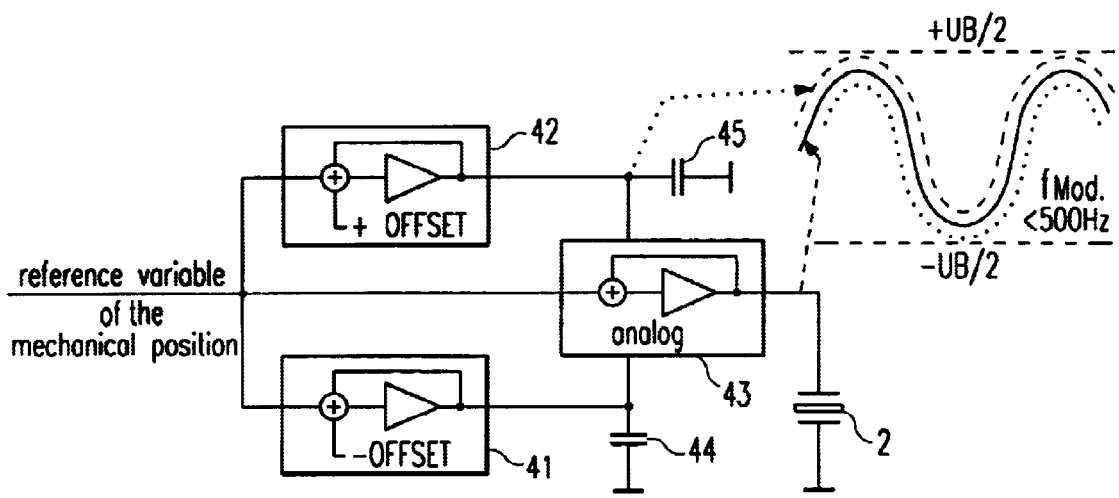
FIG. 6 shows a block diagram of a known fine control.

According to FIG. 6 it is known to use two completely switched amplifiers 41 and 42 in the conventional manner (as in FIG. 3, but without internal current control) in order to provide the required positive and negative supply voltage in a corresponding manner for the fine control of the downstream arranged analog final stage 43.

For this purpose, the assemblies 41 and 42 feed back their respective output voltages to the internal amplifier circuits 14 according to FIG. 3 and compare them with the reference variable of the physical position, but add a small fixed offset which offsets the amplifier 41 downwards by a small fixed amount and offsets the amplifier 42 upwards by the same amount.

The two capacitors 44 and 45, whose capacitances are low compared to the capacitance of the piezotranslator 2, provide the filtering of the switching frequency, which is required for the function of the connected amplifiers.

The downstream amplifier 43 with its own (not shown) control loop generates the correct output voltage at its output, again with only little noise, which is supplied to the piezotranslator 2.

The drawback of the above described circuit arrangement is that under control engineering conditions, it is possible to a limited extent only, to stably maintain a small difference of fixed magnitude between the two outputs of the amplifiers 41 and 42. This might be conceivable in the case of static mechanical reference variables and in the lower modulation range but is no longer possible in the range of a higher frequency modulation of approx. 2 kHz. The amplifier-specific and unavoidable phase shifts in the two amplifiers 41 and 42 hardly reach values of approx. 90° and a synchronisation in these two amplifiers can hardly be achieved.

Already a small phase difference between the amplifiers 41 and 42, however, is sufficient to exceed the desired small control difference several times. Upon reaching the only insufficiently suppressed points of resonance, at the latest, the synchronisation problems become insurmountable. The principally known solution of noise reduction can therefore not be employed in the high frequency range of the modulation, which in fact is the interesting one.

With a limitation to the lower frequency range, however, the upstream energy-saving amplifiers 41 and 42 become rather meaningless, because only low power values occur due to the decreasing currents in the piezotranslator 2.

As shown in FIG. 5, according to another embodiment, only one amplifier 41a is formed instead of the amplifiers 41 and 42, which greatly reduces the overall expenditure.

The output voltage of this amplifier is still somewhat lower than the output voltage which is expected at the piezotranslator 2. By means of the additional provision of an internal current control loop 13 (according to FIG. 3), when compared to the amplifier 41, any points of resonance are effectively suppressed in the amplifier 41a.

The downstream final stage 43 for fine control is adopted, as is the capacitor 44.

The known upper amplifier 42 (FIG. 6) is replaced by an additional new voltage source 46. This is also connected with the output of the amplifier 41a and includes an internally installed capacitor of adequate magnitude for blocking.

The magnitude of the direct voltage source 46 corresponds to the previously controlled difference between the outputs 41 and 42, and is small compared to the maximum working voltage which can be supplied to the piezotranslator 2. It corresponds essentially to twice the peak value of the noise voltage occurring at the output of the amplifier 41.

The output of the dissipative amplifier 43 is controlled by means of a first control loop by feeding back the voltage of the piezotranslator 2, its charge integral, or a mechanical sensor 20 (similar to FIG. 3 or 4) to the correct, noise-free value which is amplified relative to the reference variable of the physical position.

The inner current control loop 13 is located in the controller of the amplifier 41a. For controlling the output voltage of the amplifier 41a, however, a separate voltage comparison is carried out independently of the amplifier 43, as this is provided for in the state of the art. The sole parameter which is responsible for the controller 14 is the difference between the output voltages of the amplifiers 41a and 43, which is directly picked-off and supplied to the controller 14. Furthermore, the comparison is no longer made against the reference variable of the physical position, but against a fixed reference voltage with a magnitude of half the source voltage.

Thus, the available supply voltage reserve for the amplifier 43 is no longer provided by the difference of the independent measurement of two parameters, which might easily be invalidated by phase errors, but is directly measured and controlled.

The advantage which results from the embodiment according to FIG. 5 lies in the following. The use of the fixed voltage source 46 allows the complete omission of a second switching amplifier 42 which is considerably more expensive. Thereby, the power losses occurring therein are avoided. By means of the resonance-suppressed current control in the amplifier 41a together with the directly controlled symmetry of the working voltage for the amplifier 43, the operation over the entire previous frequency range of the amplifier 41a is possible without any restriction.

All in all, the inventive circuit arrangement as well as the proposed control concept allow the exact control of piezotranslators as electrical actuating elements with a moderate circuit expenditure, with an optimisation of the energy recovery being possible at the same time. By designing the control loop with or without an additional desired positioning control, effects of undesired non-linearities of the piezotranslator, such as the hysteresis effect and the long-term drift, can be prevented.

LIST OF REFERENCE NUMERALS

| | |
|---|---|
| 1 | Intermediate store |
| 2 | Piezotranslator |
| 3, 4 | Switches |
| 5, 6 | Recovery diodes |
| 7, 8 | Voltage sources UB/2 |
| 9 | MOSFET |
| 10 | External blocking diode |
| 11 | Commutating diode |
| 12 | Current sensor |
| 13 | First controller |
| 14 | Second controller |
| 15 | Amplifier |
| 16, 17, 22 | Filters |
| 18 | Final stage |
| 19 | Third controller |
| 20 | Mechanical position sensor |
| 21 | Amplifier-filter combination |
| 41, 42 | Switched amplifiers |
| 41a | Switched amplifier including current control |
| 43 | Analog amplifier in low-noise configuration |
| 44, 45 | Filter capacitors |
| 46 | DC voltage source |

What is claimed is:

1. A wired circuit arrangement for the dynamic control of piezotranslators (2) with energy recovery by means of a single inductive intermediate store (1) which is connected in series with the piezotranslators (2) as well as by clocked switches, wherein for achieving a predetermined linear voltage characteristic at the piezotranslator (2), a secondary circuit is designed as a half-bridge consisting of the clocked switches (3, 4) having an output, respectively, wherein the inductive intermediate store (1) is connected to the output of the clocked switches, respectively, and connected in series with the piezotranslator (2), with the clocked switches (3, 4) connected to an upper supply voltage or a lower supply voltage and being externally controlled and operated at a high cycle or switching frequency in such a manner that the intermediate store is alternately connected with the upper or lower supply voltage ((UB/2) at the most, with the series connection of piezotranslator (2) and inductive intermediate store (1) carrying a superimposed bridge direct current; wherein the clocked switches (3, 4) are formed as MOS transistors (9), with an external diode (10) being connected in series with the clearance between contacts, and this series connection being bridged by a commutating diode (11) which is oppositely poled to the diode (10).

2. The circuit arrangement according to claim 1, comprising a current sensor (12) connected to a first controller (13) and a final stage (18) connected to the first controller (13), wherein the current sensor (12) for generating a control voltage which is proportional to the output current of the final stage (18) is connected in the circuit arrangement of the piezotranslator (2) for controlling the circuit arrangement, with the control voltage being connected with a first input of the first controller (13), wherein a second input of the first controller (13) is connected to an output of a second controller (14), at whose two inputs a predetermined reference variable according to the physical position of the piezotranslator (2) and an actual value which is proportional to the output voltage of the final stage (18) are applied.

3. The circuit arrangement according to claim 2, wherein a third controller (19) is provided for a positioning control, having a first input receiving the reference variable of the physical position of the piezotranslator (2) and having a second input connected to a sensor (20) detecting a mechanical actual value, with the output of the third controller (19) being connected with one of the inputs of the second controller (14).

4. The circuit arrangement according to claim 2, wherein the second controller (14) feeds back the integral of the piezotranslator current in lieu of a voltage which is proportional to the output voltage of the final stage (18).

5. A wired circuit arrangement for the dynamic control of ceramic solid-state actuators in the form of piezotranslators with energy recovery by means of a single inductive intermediate store, which is connected in series with the piezotranslator, as well as by clocked switches arranged in a half-bridge, wherein, for achieving a predetermined linear voltage characteristic at the piezotranslator, a current control comprising a current sensor connected to the clocked switches and controlling the clocked switches of the half-bridge at a high clock or switching frequency and wherein a position control is superimposed on the current control.

6. The circuit arrangement according to claim 5, wherein the clocked switches (3, 4) are formed as MOS transistors (9), with an external diode (10) being connected in series with the clearance between contacts, and this series connection being bridged by a commutating diode (11) which is oppositely poled to the diode (10).

7. The circuit arrangement according to claim 5, wherein the intermediate store is connected in close proximity to the piezotranslator.

8. The circuit arrangement according to claim 5, wherein, for controlling the arrangement, the current sensor is arranged in a secondary circuit of the piezotranslator for determining a control voltage that is proportional to an output voltage of a final stage, wherein the current sensor (12) is connected to a first controller (13) and a final stage 18 is connected to the first controller (13), wherein the control voltage is supplied to a first input of the first controller, wherein a second input of the first controller is connected to an output of a second controller having two inputs supplied with a predetermined reference variable according to the physical position of the piezotranslator and with an actual value which is proportional to the output voltage of the final stage.

9. The circuit arrangement according to claim 5, wherein a voltage control is provided, wherein the position control is superimposed on the voltage control and the voltage control is superimposed on the current control.

10. The circuit arrangement according to claim 9, wherein, for improving the dynamic behavior of the control action, the voltage control feeds back the integral of the piezotranslator current instead of a voltage which is proportional to the output voltage of the final stage.

* * * * *